United States Patent
Kim et al.

(10) Patent No.: US 10,782,588 B2
(45) Date of Patent: Sep. 22, 2020

(54) OPTOELECTRONIC ELEMENT

(71) Applicant: ELECTRONICS AND TELECOMMUNICATIONS RESEARCH INSTITUTE, Daejeon (KR)

(72) Inventors: Gi Heon Kim, Daejeon (KR); Yong Hae Kim, Daejeon (KR); Chi-Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/281,934

(22) Filed: Feb. 21, 2019

(65) Prior Publication Data

US 2019/0187537 A1 Jun. 20, 2019

Related U.S. Application Data

(62) Division of application No. 15/586,705, filed on May 4, 2017, now abandoned.

(30) Foreign Application Priority Data

Nov. 11, 2016 (KR) .......................... 10-2016-0150572

(51) Int. Cl.
G02F 1/29 (2006.01)
G02F 1/1335 (2006.01)
G02F 1/1343 (2006.01)
G02F 1/1347 (2006.01)

(52) U.S. Cl.
CPC ............. *G02F 1/29* (2013.01); *G02F 1/13475* (2013.01); *G02F 1/133514* (2013.01); *G02F 1/134309* (2013.01); *G02F 1/133526* (2013.01); *G02F 2001/294* (2013.01); *G02F 2202/043* (2013.01)

(58) Field of Classification Search
CPC ........ G02C 7/101; G02F 1/29; G02F 1/13725
See application file for complete search history.

(56) References Cited

U.S. PATENT DOCUMENTS

2007/0287830 A1* 12/2007 Sano ....................... C09B 31/18
534/730
2010/0118413 A1 5/2010 Kim et al.
2010/0195203 A1* 8/2010 Zuidema ................ G02B 30/27
359/463

(Continued)

FOREIGN PATENT DOCUMENTS

KR 10-2010-0052115 A 5/2010
KR 10-1100392 B1 12/2011
KR 10-2013-0027705 A 3/2013

OTHER PUBLICATIONS

Kyong Chan Heo et al., "Thermally tunable-focus lenticular lens using liquid crystal", Applied Optics, vol. 52, No. 35, pp. 8460-8464, Dec. 10, 2013.

*Primary Examiner* — Jessica M Merlin
(74) *Attorney, Agent, or Firm* — Rabin & Berdo, P.C.

(57) ABSTRACT

Provided is an optoelectronic element including a first substrate, a first electrode on the first substrate, a first lens pattern disposed on the first electrode and including a liquid crystal and a black dye molecule, a second lens pattern disposed on the first lens pattern, and a second electrode on the second lens pattern, wherein the black dye molecule includes about 1 to 4 azo groups and about 2 to 5 aromatic cyclic compounds.

7 Claims, 5 Drawing Sheets

(56) References Cited

U.S. PATENT DOCUMENTS

2014/0232960 A1* 8/2014 Schwartz ............ G02B 26/004
  349/12
2015/0092267 A1 4/2015 Park et al.
2016/0266376 A1 9/2016 Nam et al.
2017/0059916 A1 3/2017 Park et al.

* cited by examiner

OPTOELECTRONIC ELEMENT

CROSS-REFERENCE TO RELATED APPLICATIONS

This application is a divisional of U.S. application Ser. No. 15/586,705, filed on May 4, 2017, which is based on and claims priority under 35 U.S.C. § 119 of Korean Patent Application No. 10-2016-0150572, filed on Nov. 11, 2016, the entire contents of which are hereby incorporated by reference.

BACKGROUND

The present disclosure herein relates to an optoelectronic element, and more particularly, to a lens of an optoelectronic element.

Optoelectronic elements are elements that convert light to electrical signals or electrical signals to light. Such optoelectronic elements may include a display element and an image sensing element. The display element is a device that converts electrical signals to optical images and visually outputs data onto a screen. Liquid crystal display devices or plasma display devices and the like are widely used as the display device. Research related to increasing the resolution and brightness of such display devices is ongoing. Moreover, methods for realizing three-dimensional images in such display devices are receiving interest. The image sensing element is an element that converts optical images into electrical signals.

A lens may focus or disperse light coming from an object. Recently, research on electronic lens has been increasing.

SUMMARY

The present disclosure provides an optoelectronic element having improved transmittance.

The present disclosure also provides an optoelectronic element having reduced power consumption.

The present disclosure further provides an optoelectronic element having an improved focal adjustment function.

An embodiment of the inventive concept provides an optoelectronic element including a first substrate; a first electrode on the first substrate; a first lens pattern disposed on the first electrode and including a liquid crystal and a black dye molecule; a second lens pattern disposed on the first lens pattern; and a second electrode on the second lens pattern, wherein the black dye molecule includes about 1 to 4 azo groups and about 2 to 5 aromatic cyclic compounds.

In an embodiment, the black dye content may be about 0.05 to 10 wt % of the liquid crystal content.

In an embodiment, a first alignment film interposed between the first electrode and the first lens pattern; and a second alignment film interposed between the first lens pattern and the second lens pattern may be further included.

In an embodiment, the second electrode may be interposed between the first lens pattern and the second lens pattern.

In an embodiment, the second lens pattern may include an insulating polymer and an electrical conductor, the electrical conductor including one of a carbon nanotube (CNT), a silver nanowire, a graphene, and/or a conductive polymer.

In an embodiment, a content of the electrical conductor may range from about 0.01 to 10 wt % of a content of the second lens pattern.

In an embodiment, an element part disposed on the first electrode and including a plurality of pixels; and color filters arranged, on the second lens pattern, in positions respectively corresponding to each of the pixels may be further included.

In an embodiment, an element part including a plurality of pixels; and color filters disposed between the element part and the first substrate may be further included.

In an embodiment of the inventive concept, an optoelectronic element includes a first substrate; a first electrode on the first substrate; a first alignment film disposed on the first electrode and including a first dye; a first lens pattern disposed on the first alignment film and including a liquid crystal; and a second alignment film disposed on the first lens pattern and including a second dye, wherein the first dye is aligned in a first direction and the second dye is aligned in second direction, the second direction intersecting with the first direction.

In an embodiment, the first dye may exhibit a black color and include about 1 to 4 azo groups and about 2 to 5 aromatic groups.

In an embodiment, the second dye may exhibit a black color and include about 1 to 4 azo groups and about 2 to 5 aromatic groups.

In an embodiment, the first dye may include a red dye, a green dye, and a blue dye; and the first alignment film may exhibit a black color.

In an embodiment of the inventive concept, an optoelectronic element includes a first substrate; a first electrode on the first substrate; a first alignment film on the first electrode; a first lens pattern disposed on the first alignment film and including a first dye, a second dye, and a third dye; a second alignment film on the first lens pattern; a second lens pattern disposed on the first lens pattern; and a second electrode on the second lens pattern, wherein the first dye, the second dye, and the third dye reflect light of different wavelengths from each other.

In an embodiment, the first dye may include a red dye; the second dye may include a green dye; and the third dye may include a blue dye.

DETAILED DESCRIPTION

Figure 1:
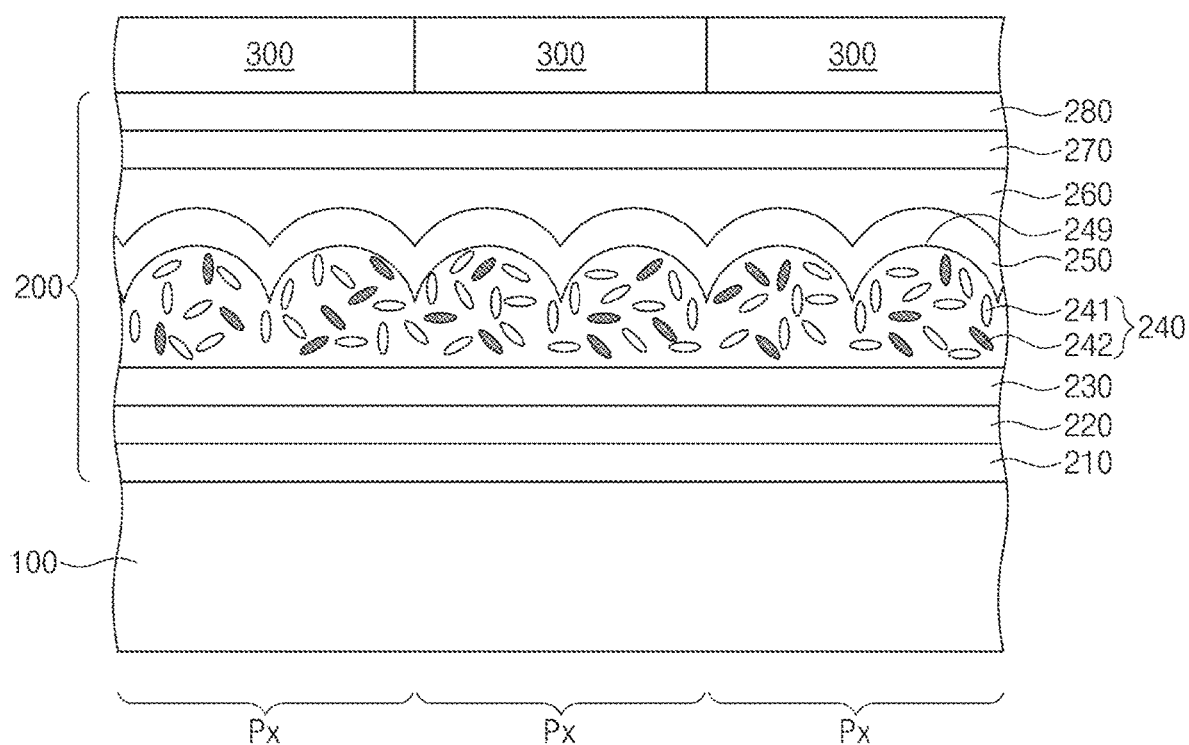
FIG. 1 is a cross-sectional view illustrating an optoelectronic element according to embodiments.

Exemplary embodiments of the present invention are described with reference to the accompanying drawings in order to more effectively describe the features and effects of the present invention. However, the present invention is not limited to the embodiments described below and may be realized in various configurations and modified in various ways. The embodiments provide a more complete description of the present invention and are provided so that a person skilled in the art may better understand the scope of the invention. A person skilled in the art will be able to understand the appropriate circumstances in which the inventive concept can be performed.

The terminology used herein is for the purpose of describing particular embodiments only and is not intended to be limiting of the invention. As used herein, singular forms are intended to include the plural forms as well, unless the context clearly indicates otherwise. The terms "comprise" and/or "comprising", when used in this specification, specify the presence of stated elements, steps, operations, and/or components, but do not preclude the presence or addition of one or more other elements, steps, operations, and/or components.

In the specification, when a film (or layer) is indicated as being "on" another film (or layer) or substrate, said film (or layer) may be formed directly on the other film (or layer) or substrate, or an intervening third film (or layer) may be present.

It will be understood that, although the terms first, second, third, etc. may be used herein to describe various regions, films (or layers), etc., these regions, films (or layers) should not be limited by these terms. These terms are only used to distinguish one region, film (or layer) from another region, film (or layer). Thus a first film in one embodiment may be termed a second film in other embodiments. Such embodiments may also include complementary embodiments thereof. Like reference numerals refer to like elements throughout.

Unless otherwise defined, all terms used in the embodiments of the present invention have the same meaning as commonly understood by a person skilled in the art to which this invention belongs.

Hereinafter, description is given of an optoelectronic element according to an embodiment of the inventive concept.

FIG. 1 is a cross-sectional view illustrating an optoelectronic element according to embodiments.

Referring to FIG. 1, an optoelectronic element 1 may include an element part 100, a lens part 200, and color filters 300. The element part 100 may include pixels Px. In an embodiment, the optoelectronic element 1 may function as a display element and output optical images. In this case, the element part 100 may emit light. The element part 100 may include a liquid crystal display (LCD) element, a field emission display (FED) element, a plasma display panel (PDP) element, or a light emitting element such as an organic light emitting diode. In an example, a liquid crystal layer may be further provided between the element part 100 and the lens part 200. According to another embodiment, the optoelectronic element 1 may function as an image sensing element, such as a camera. In this case, the element part 100 may include an image sensing element and convert external optical images into electrical signals. For example, the element part 100 may include sensing transistors and logic transistors. The sensing transistors may output incident light as optical signals. The logic transistors may control the sensing transistors.

The lens part 200 may be provided on the element part 100. The lens part 200 may include a first substrate 210, a first electrode 220, a first alignment film 230, a first lens pattern 240, a second alignment film 250, a second lens pattern 260, a second electrode 270, and a second substrate 280. The first substrate 210 may be transparent. The first substrate 210 may include plastic or glass. The first electrode 220 may be provided on the first substrate 210. The first electrode 220 may include a transparent conductive oxide.

The first lens pattern 240 may be provided on the first electrode 220. The first lens pattern 240 may have protrusions 249. The protrusions 249 may each have a hemispherical shape. The first lens pattern 240 may include a liquid crystal 241 and a dye 242. The liquid crystal 241 may be transparent. The liquid crystal 2410 may be a molecule having a long axis. The alignment of the liquid crystal 241 may be controlled by the potential difference between the first electrode 220 and the second electrode 270. The dye 242 may include a dichroic dye. The dye 242 may have a long axis. The alignment of the long axis of the dye 242 may be adjusted according to the alignment of the liquid crystal 241. The dye 242 may exhibit a black color. Light which has passed through the lens pattern 240 may be polarized due to the alignment of the long axis of the dye. According to an embodiment, the first lens pattern 240 includes the dye 242, and thus the optoelectronic element 1 may exclude a separate polarizing plate. Thus, since optical loss and power consumption due to a polarizing plate is prevented/reduced, the optoelectronic element 1 may exhibit high transmittance and low power consumption. The polarization of the first lens pattern 240 may be adjusted to adjust the focus of images output by the optoelectronic element 1 or input into the optoelectronic element. According to another embodiment, the amount of light that passes through the first lens pattern 240 when the long axis of the dye 242 is aligned in a first direction may differ from the amount of light that passes through the first lens pattern 240 when the long axis of the dye 242 is aligned in a second direction. In an example, the first direction may be a direction perpendicular to light incident to the first lens pattern 240, and the second direction may be a direction parallel to light incident on the first lens pattern 240. The alignment of the dye 242 may be adjusted to adjust the amount of light that passes through the first lens pattern 240. Accordingly, the brightness and darkness of color displayed in the optoelectronic element 1 may be adjusted. The optoelectronic element 1 may exhibit high transmittance. According to another embodiment, the alignment of the liquid crystal 241 and the dye 242 may be adjusted such that the optoelectronic element 1 inputs or outputs a three-dimensional image.

The dye 242 may have a conjugated structure. For example, the dye 242 may include about 1 to 4 azo groups and about 2 to 5 aromatic groups. The aromatic groups may be bonded with the azo groups. For example, the dye 242 may be one from the group represented by Formulas 1-1 to 1-4 below.

  [Formula 1-1]

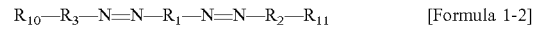  [Formula 1-2]

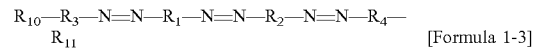  [Formula 1-3]

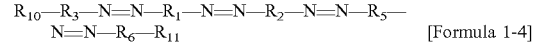  [Formula 1-4]

Here, R1, R2, R3, R4, R5, and R6 may each independently be one from the group represented by Formula 2 below.

[Formula 2]

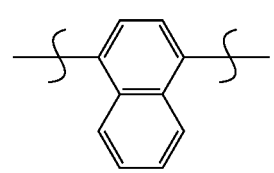

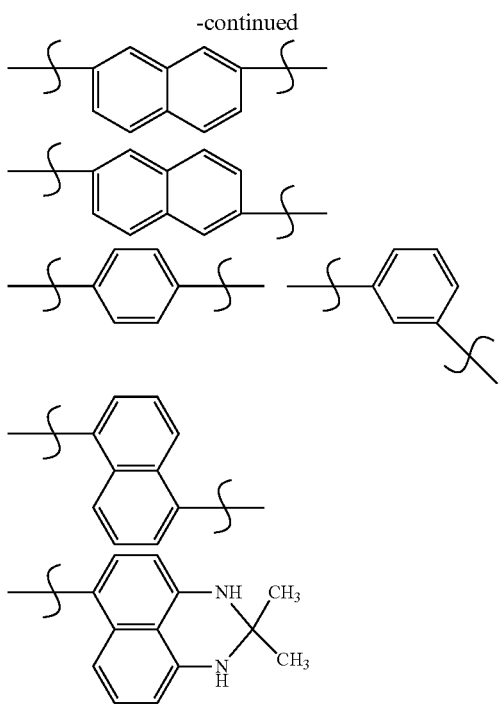

R10 and R11 may each independently be one selected from among —H, —$CH_3$, —$C_2H_5$, —$C_3H_7$, —$C_4H_9$, $C_5H_{11}$, $C_6$ to $C_{10}$ linear alkyl groups, $C_6$ to $C_{10}$ branched alkyl groups, and cyclohexane.

The dye 242 content may be about 0.05 to 10 wt % of the liquid crystal 241 content. When the dye 242 content is less than about 0.05 wt % of the liquid crystal 241 content, light may be insufficiently polarized or reflected by the dye 242. When the dye 242 content is greater than 10 wt % of the liquid crystal 241 content, light may be unable to pass through the first lens pattern 240.

The first alignment film 230 may be interposed between the first substrate 210 and the first lens pattern 240. The first alignment film 230 may include a polymer. The polymer may include one from the group represented by Formula 3 below.

[Formula 3]

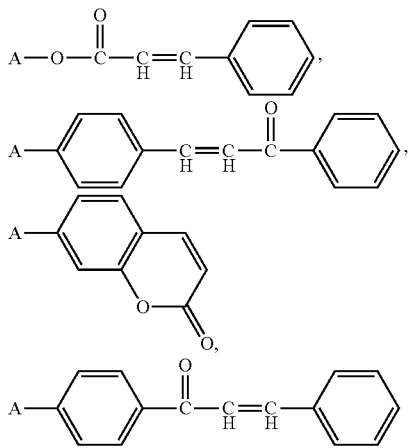

Here, A may be one selected from among cyclic or linear alkyl groups, cyclic or linear alkene groups, and cyclic or linear alkyne groups having carbon numbers of about 1 to 10,000.

The second alignment film 250 may be disposed on the first lens patterns. The second alignment film 250 may include a polymer. The polymer in the second alignment film 250 may include one from the group represented by Formula 3 above. The first alignment film 230 and the second alignment film 250 may more uniformly align the liquid crystal 241 and the dye 242. In another example, one among the first alignment film 230 and the second alignment film 250 may be excluded.

The second lens pattern 260 may be disposed on the second alignment film 250. The refractive index of the second lent pattern 260 may be, for example, about 1.45 to 1.60. The second lens pattern 260 may include an insulating polymer. In an example, the second lens pattern 260 may include an acrylic polymer, an epoxy polymer, an aromatic polymer, an acrylonitrile polymer, and/or a chloride polymer, but is not limited thereto. The second lens pattern 260 may be transparent.

The second electrode 270 may be disposed on the second lens pattern 260. The second substrate 280 may be disposed on the second electrode 270. The second electrode 270 and the second substrate 280 may include materials described with respect to examples of the first electrode 220 and the first substrate 210, respectively. The second electrode 270 and the second substrate 280 may be transparent.

The color filters 300 may be disposed on the second substrate 280. The color filters 300 may be respectively provided in the pixels Px. The color filters 300 may include a red color filter, a green color filter, and a blue color filter. When the optoelectronic element 1 functions as a display element, a color filter pattern may control the color displayed in the optoelectronic element 1. When the optoelectronic element 1 functions as an image sensing element, the color filter may adjust the wavelength of the light incident on the element part 100.

Hereinafter, description is given of a method for manufacturing a lens part according to embodiments.

A first electrode 220 may be disposed on a first substrate 210. A first alignment film 230 may be formed on the first electrode 220. A second substrate 280, a second electrode 270, and a second lens pattern 260, which are laminated, may be prepared. A monomer solution may be prepared, for example, by mixing a monomer and an initiator. The monomer may include an acrylic monomer, an aromatic monomer, an acrylonitrile monomer, and/or a chloride monomer. For example, the acrylic monomer may include triethylopropane triacrylate (TMPTA), tri(propylene glycol) diacrylate (TPGDA), penthaerithritol triacrylate (PETA), trimethylolpropane ethoxylate triacrylate (TMPEOTA), methyl methacrylate (MMA), methacrylate (MA), tri(propylene glycol) glycerolate diacrylate (TPGDA), vinylacrylate (VA), ethylene glycol dimethacrylate (EGDA), an epoxy acrylate monomer or oligomer, and/or 1,6-hexandiol diacrylate (HAD). The aromatic monomer may include styrene (ST) and/or divinyl benzene (DVB). The acrylonitrile monomer may include acrylonitrile (AN). The chloride monomer may include vinylidene chloride (VDC) and/or vinylbenzyl chloride (VBC). In another example, the monomer may include vinyl stearate (VS) and/or vinyl propionate (VP). For example, the initiator may include 1-hydroxy-cyclohexyl-phenyl-ketone, 2-methyl-1[4-(methylthio)phenyl]-2-morpholinopropane-1-one, 1-hydroxy-2-methyl-1-phenyl-propane-1-one, benzophenone, 2-hydroxy-1-[4-(2- hydroxyethoxy)phenyl]-2-methyl-1propanone, methylbenzoylformate (Darocur MBF), alpha, alpha-dimethoxy-alpha-phenylacetophenone, 2-benzyl-2-(dimethylamino)-1-[4-(morpholinyl) phenyl]-1-butanone, diphenyl (2,4,6-trimethylbenzoyl)-phosphine oxide, phosphine oxide, phenyl bis(2,4,6-trimethyl benzoyl), bis(.eta.5-2,4-cyclopentadien-1-yl) bis[2,6-difluoro-3-(1h-pyrrol-1-yl)phenyl] titanium, 1-hydroxy-cyclohexylphenyl-ketone (CPA) and/or mixtures thereof. The monomer solution may be applied onto the second electrode 270 to form a preliminary film. A mold may be applied onto the preliminary film to form recessed portions on a surface of the preliminary film. The preliminary film may be cured by light or heat to form the second lens pattern 260. A second alignment film 250 may be formed on the second lens pattern 260.

A mixture of a liquid crystal 241 and a dye 242 may be prepared. The mixture may be provided between the first alignment film 230 and the second alignment film 250 to form the first lens pattern 240. As a result, the manufacture of the lens part 200 may be completed. The manufacture of the lens part 200 is not limited thereto, and various methods may be used to manufacture the lens part 200.

Figure 2:
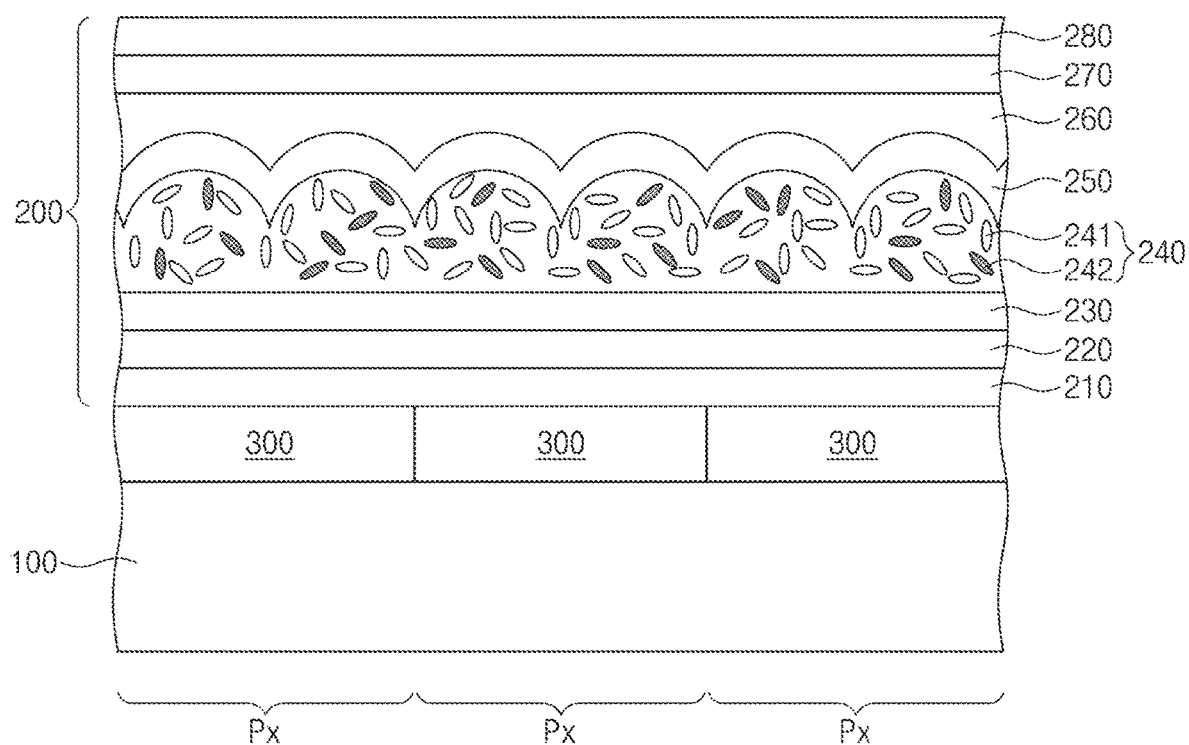
FIG. 2 is a cross-sectional view illustrating an optoelectronic element according to another embodiment.

FIG. 2 is a cross-sectional view illustrating an optoelectronic element according to another embodiment. Hereinafter, descriptions given above are not repeated.

Referring to FIG. 2, an optoelectronic element 2 may include an element part 100, a lens part 200, and color filters 300. The element part 100, the lens part 200, and the color filters 300 may be substantially the same as described with reference to FIG. 1. However, the color filters 300 may be provided between the element part 100 and the lens part 200.

Figure 3:
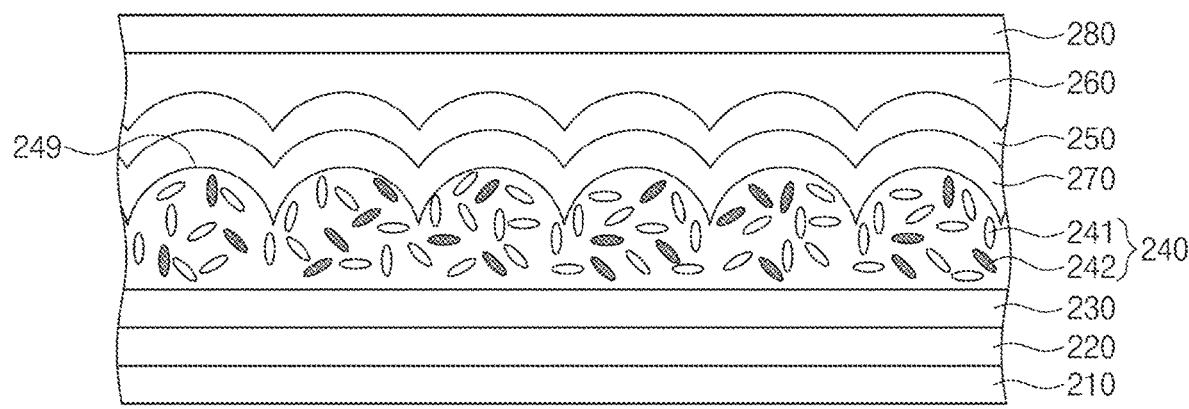
FIG. 3 is a cross-sectional view illustrating a lens unit according to another embodiment.

FIG. 3 is a cross-sectional view illustrating a lens unit according to another embodiment. Hereinafter, descriptions given above are not repeated.

Referring to FIG. 3, a lent part 201 may include a first substrate 210, a first electrode 220, a first alignment film 230, a first lens pattern 240, a second alignment film 250, a second electrode 270, a second lens pattern 260, and a second substrate 280, which are laminated. The first substrate 210, the first electrode 220, the first alignment film 230, the first electrode 220, the second electrode 270, the second alignment film 250, and the second substrate 280 may be substantially the same as described with reference to FIG. 1. The second substrate 270 may be interposed between the first lens pattern 240 and the second lens pattern 260, specifically, between the first lens pattern 240 and the second alignment film 250. The second electrode 270 may have a shape that corresponds to a protrusion 249 of the first lens pattern 240.

Figure 4:
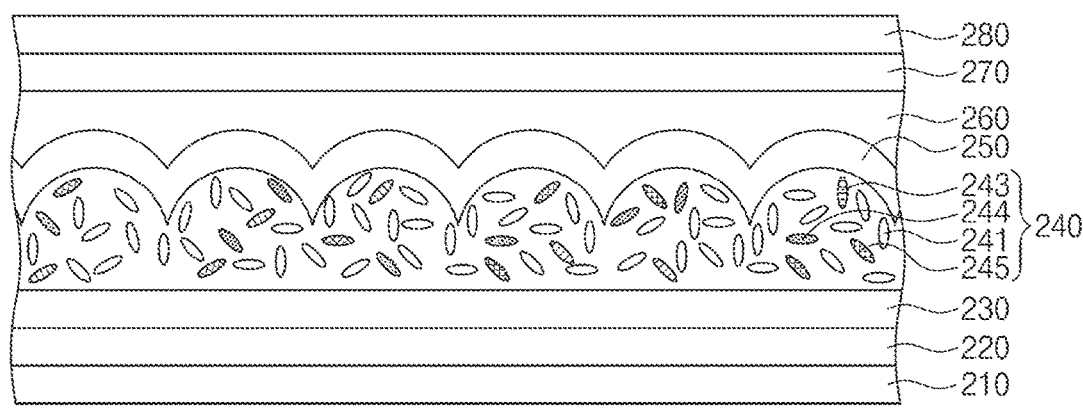
FIG. 4 is a cross-sectional view illustrating a lens unit according to still another embodiment.

FIG. 4 is a cross-sectional view illustrating a lens unit according to still another embodiment. Hereinafter, descriptions given above are not repeated.

Referring to FIG. 4, a lens part 202 may include a first substrate 210, a first electrode 220, a first alignment film 230, a first lens pattern 240, a second alignment film 250, a second lens pattern 260, a second electrode 270, and a second substrate 280, which are laminated.

The first lens pattern 240 may include a liquid crystal 241, a first color dye 243, a second color dye 244, and a third color dye 245. The first to third color dyes 243, 244, and 245 may be dichroic color dyes. The first to third color dyes 243, 244, and 245 may reflect light of different wavelengths from each other. For example, the first color dye 243, the second color dye 244, and the third color dye 245 may include a red dye, a green dye, and a blue dye, respectively. Black color may be realized in the first lens pattern 240 by adjusting the ratios of the first to third color dyes 243, 244, and 245. The first lens pattern 240 includes the first to third dyes 243, 244, and 245, and thus the brightness and darkness of light that has passed through the lens part 202 may be adjusted. In another example, by adjusting the alignment of the first to third color dyes 243, 244, and 245, the lens part 202 may adjust the focus of light which is input or output.

Figure 5:
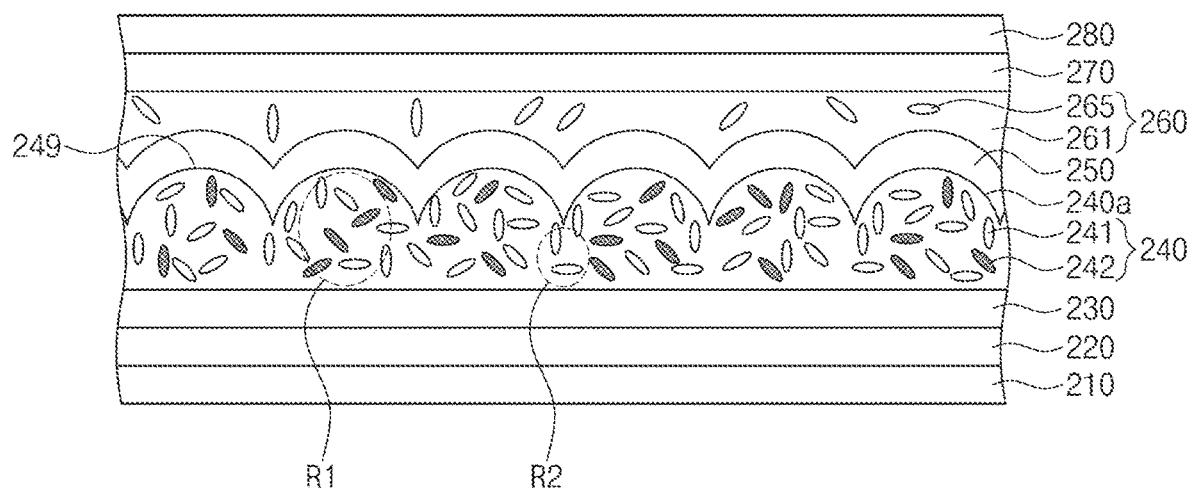
FIG. 5 is a cross-sectional view illustrating a lens unit according to still another embodiment.

FIG. 5 is a cross-sectional view illustrating a lens unit according to still another embodiment. Hereinafter, descriptions given above are not repeated.

Referring to FIG. 5, a lens part 203 may include a first substrate 210, a first electrode 220, a first alignment film 230, a first lens pattern 240, a second alignment film 250, a second lens pattern 260, a second electrode 270, and a second substrate 280, which are laminated. Since the first lens pattern 240 includes protrusions 249, the distance between a first region R1 of the first lens pattern 240 and the second electrode 270 may differ from the distance between a second region R2 of the first lens pattern 240 and the second electrode 270. Here, the first region R1 of the first lens pattern 240 may include the uppermost portion of the top surface 240a of the first lens pattern 240, and the second region R2 may include the lowermost portion of the top face 240a of the first lens pattern 240. The electric field which is applied to the first region R1 of the first lens pattern 240 may differ from the electric field which is applied to the second region R2. The alignment of a liquid crystal 241 and a dye 242 in the first region R1 may differ from the alignment of the liquid crystal 241 and the dye 242 in the second region. In this case, the transmittance of the first region R1 of the first lens pattern may differ from the transmittance of the second region R2 of the first lens pattern 240, or it may be difficult for the lens part 203 to achieve focus. According to an embodiment, the second lens pattern 260 may include an electrical conductor 265 in addition to an insulating polymer 261. The insulating polymer 261 may include the acrylic polymer, epoxy polymer, aromatic polymer, acrylonitrile polymer, and/or chloride polymer described above with reference to FIG. 1. The electrical conductor 265 may include a carbon nanotube (CNT) a silver nanowire, a graphene, and/or a conductive polymer (for example, poly (3,4-ethylenedioxythiophene) polystyrene sulfonate (PEDOT:PSS)). Formation of the second lens pattern 260 may include preparation of a monomer solution, formation of a preliminary film, patterning of the preliminary film, and curing of the preliminary film. The monomer solution may be prepared by mixing a monomer and an initiator. Here, the electrical conductor 265 may be further added to the monomer solution. The preliminary film may be formed by applying the monomer solution onto the second electrode 270. The second lens pattern 260 may be formed by performing patterning and curing operations on the preliminary film. Since the second lens pattern 260 includes the electrical conductor 265, a uniform electrical field may be applied to the first lens pattern 240 when voltage is applied to the first electrode 220 and the second electrode 270. The alignment of the liquid crystal 241 and the dye 242 in the first region R1 of the first lens pattern 240 may be substantially the same as the alignment of the liquid crystal 241 and the dye 242 in the second region R2. A more uniform transmittance may be achieved in the lens part 203. Focus may be more easily controlled in the lens part 203. A content of the electrical conductor 265 may range from about a content of 0.01 to 10 wt % of the second lens pattern 260. When the content of the electrical conductor 265 is less than about 0.01 wt % of the content of the second lens pattern 260, the electrical field applied to the first lens pattern 240 may be non-uniform. When the content of the electrical conductor 265 is more than about 10 wt % of the content of the second lens pattern 260, the electrical conductor 265 may be phase-separated from the insulating polymer 261 in the second lens pattern 265.

Figure 6:
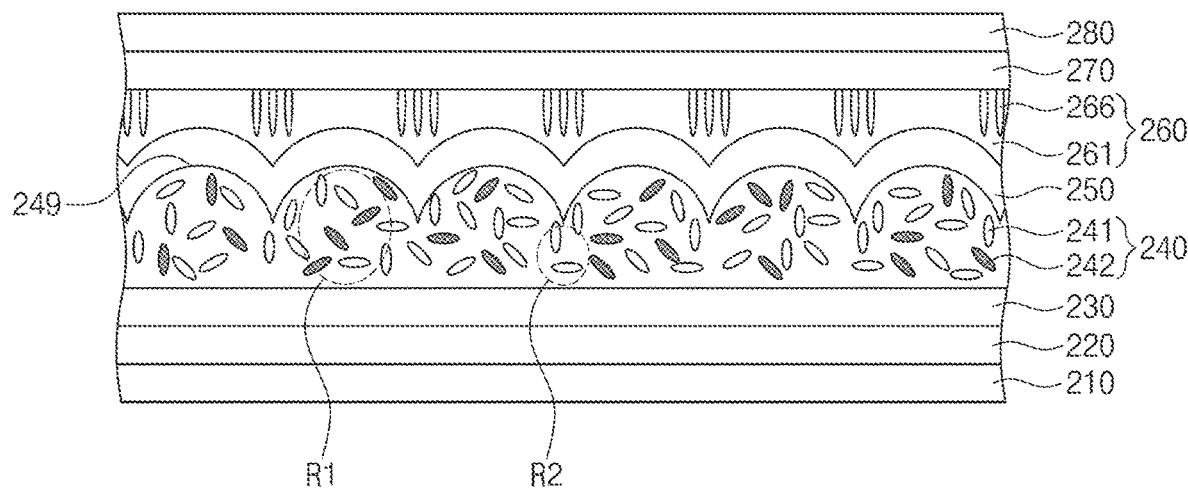
FIG. 6 is a cross-sectional view illustrating a lens unit according to still another embodiment.

FIG. 6 is a cross-sectional view illustrating a lens unit according to still another embodiment. Hereinafter, descriptions given above are not repeated.

Referring to FIG. 6, a lens part 204 may include a first substrate 210, a first electrode 220, a first alignment film 230, a first lens pattern 240, a second alignment film 250, a second lens pattern 260, a second electrode 270, and a second substrate 280, which are laminated. According to an embodiment, the second lens pattern 260 may include an insulating polymer 261 and an electrical conductor 266. The electrical conductor 266 may include a carbon nanotube (CNT), a silver nanowire, and/or a graphene. The electrical conductor 266 may range from about 0.01 to 10 wt % of the lens pattern 260. The electrical conductor 266 may be directly grown on the second electrode 270. The number or length of the electrical conductors 266 on a second region R2 of the first lens pattern 240 may differ from the number or length of the electrical conductors 266 on a first region R1. For example, the number of length of the electrical conductors 266 on the second region R2 may be greater than the number or length of the electrical conductors 266 on the first region R1. The electrical conductor 266 may be selectively grown on some areas on the second substrate 280. For example, the electrical conductor 266 may not be provided on the second region R2 of the first lens pattern 240. The arrangement, number, or length of the electrical conductors 266 is not limited to arrangements, numbers, or lengths illustrated herein, but may be variously modified. By adjusting the arrangement, number, or length of the electrical conductors 266, an electrical field may be more uniformly applied to the first lens pattern 240.

Figure 7:
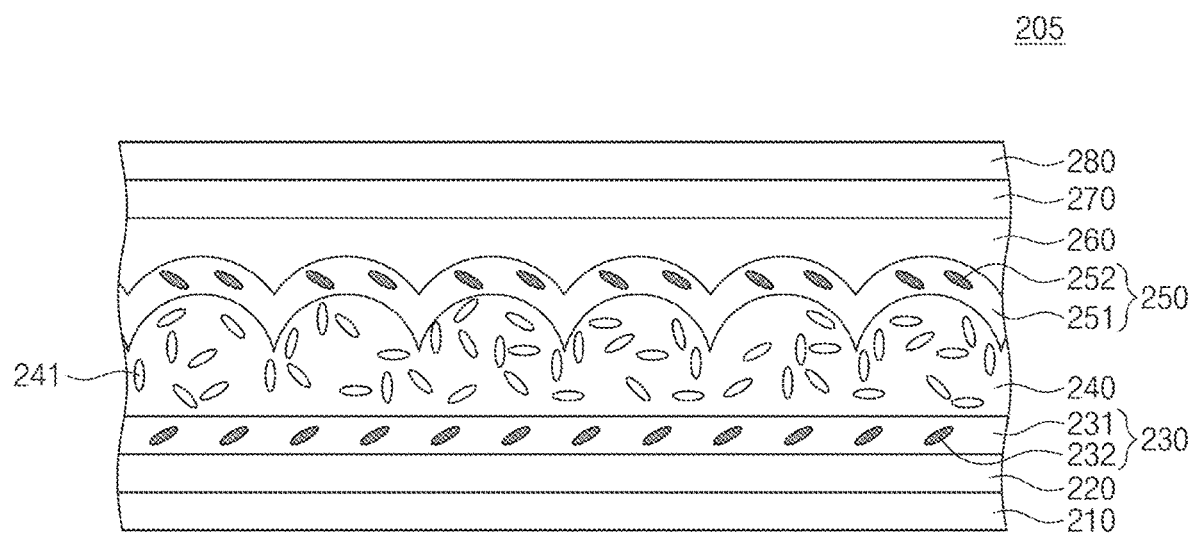
FIG. 7 is a cross-sectional view illustrating a lens unit according to still another embodiment.

FIG. 7 is a cross-sectional view illustrating a lens unit according to still another embodiment. Hereinafter, descriptions given above are not repeated.

Referring to FIG. 7, a lens part 205 may include a first substrate 210, a first electrode 220, a first alignment film 230, a first lens pattern 240, a second alignment film 250, a second lens pattern 260, a second electrode 270, and a second substrate 280, which are laminated. The first alignment film 230 may include a first dye 232 in addition to a first polymer 231. The first polymer 231 may include one from the group represented by Formula 3 above. The first dye 232 may include the same material as the dye 242 described with reference to FIG. 1. The first dye 232 may be dispersed inside the first alignment film 230. The first dye 232 may exhibit a black color. The first dye 232 may be one from the group represented by Formulas 1-1 to 1-4. The first dye 232 may be aligned with a first direction. The first alignment film 230 may include the first dye 232, and thus may polarize light. The a content of first dye 232 may range from about 0.05 to 10 wt % of a content of the first alignment film 230. When the content of the first dye 232 is less than about 0.05 wt % of the content of the first alignment film 230, the first alignment film 230 may be insufficient for polarizing or absorbing/reflecting light. When the content of the first dye 232 is more than about 10 wt % of the content of the first alignment film 230, light may be unable to pass through the first alignment film 230. In another example, the first dye 232 may include a red dye, a green dye, and a blue dye. In this case, the first alignment film 230 may exhibit a black color.

The first lens pattern 240 may include a liquid crystal 241. In contrast to the descriptions provided with reference to FIGS. 1 to 6, the first lens pattern 240 may exclude a dye 242.

The second alignment film 250 may include a second polymer 251 and a second dye 252. The second polymer 251 may be identical to the polymer exemplarily described with reference to FIG. 1. The second polymer 252 may be one from the group represented by Formulas 1-1 to 1-4 above. For example, the second dye 252 may include the same material as the first dye 242. A content of the second dye 252 may range from about 0.05 to 10 wt % of a content of the second alignment film 250. The second dye 252 may exhibit a black color. In another example, the second dye 252 may include a red dye, a green dye, and a blue dye, and thus the first alignment film 230 may exhibit a black color. The second dye 252 may be aligned with second direction. The second direction may intersect the first direction. When viewed on a plane, the long axis of the second dye 252 may be aligned with a direction perpendicular to the long axis of the first dye 232. The second alignment film 250 may include the second dye 252, and thus may polarize light. The first alignment film 230 and the second alignment film 250 may respectively include the first dye 232 and the second dye 252, and thus the lens part 205 may exclude a polarizing plate. The lens part 205 may exhibit high transmittance and low power consumption.

The second lens pattern 260 may be substantially the same as described with reference to FIG. 1. In another example, the second lens pattern 260 may further include the electrical conductor 265 in FIG. 5 or the electrical conductor 266 in FIG. 6

According to an embodiment of the inventive concept, a lens part may include a first lens pattern, a first alignment film, or a second alignment film. At least one of the first lens pattern, the first alignment film, or the second alignment film may include a dye. The dye may exhibit a black color. The alignment of the dye may be adjusted, and thus light which has passed through the lens part may be polarized. Accordingly, the focus of an image output by an optoelectronic element or input into the optoelectronic element may be adjusted. The transmittance of the optoelectronic element may be improved.

Detailed descriptions of the present invention given above are not intended to limit the present invention to embodiments disclosed herein. Rather, various other combinations, modifications, and usage thereof in other environments are possible without departing from the concepts of the present invention. The appended claims are to be understood as including other embodiments.

What is claimed is:
1. An optoelectronic element comprising:
a first substrate;
a first electrode on the first substrate;
a first lens pattern disposed on the first electrode and including a liquid crystal and a black dye molecule;
a second lens pattern disposed on the first lens pattern and including an insulating polymer and an electrical conductor; and
a second electrode on the second lens pattern, wherein the black dye molecule includes 1 to 4 azo groups and 2 to 5 aromatic cyclic compounds,
wherein the electrical conductor includes one of a carbon nanotube (CNT), a silver nanowire, a graphene, and/or a conductive polymer.

2. The optoelectronic element of claim 1, wherein a content of the black dye molecule is 0.05 to 10 wt % of a content of the liquid crystal.

3. The optoelectronic element of claim 1, further comprising:
   a first alignment film interposed between the first electrode and the first lens pattern; and
   a second alignment film interposed between the first lens pattern and the second lens pattern.

4. The optoelectronic element of claim 1, wherein the second electrode is interposed between the first lens pattern and the second lens pattern.

5. The optoelectronic element of claim 1, wherein a content of the electrical conductor range from 0.01 to 10 wt % of a content of the second lens pattern.

6. The optoelectronic element of claim 1, further comprising:
   an element part disposed on the first electrode and including a plurality of pixels; and
   color filters arranged, on the second lens pattern, in positions respectively corresponding to each of the pixels.

7. The optoelectronic element of claim 1, further comprising:
   an element part including a plurality of pixels; and
   color filters disposed between the element part and the first substrate.

\* \* \* \* \*